United States Patent
Ohishi et al.

(10) Patent No.: US 7,903,235 B2
(45) Date of Patent: Mar. 8, 2011

(54) SURVEYING INSTRUMENT AND SURVEYING METHOD

(75) Inventors: Masahiro Ohishi, Tokyo (JP); Isao Minegishi, Tokyo (JP)

(73) Assignee: Topcon Corporation, Tokyo (JP)

( * ) Notice: Subject to any disclaimer, the term of this patent is extended or adjusted under 35 U.S.C. 154(b) by 315 days.

(21) Appl. No.: 11/992,517

(22) PCT Filed: Aug. 10, 2006

(86) PCT No.: PCT/JP2006/315845
§ 371 (c)(1),
(2), (4) Date: Jul. 8, 2008

(87) PCT Pub. No.: WO2007/034635
PCT Pub. Date: Mar. 29, 2007

(65) Prior Publication Data
US 2009/0268193 A1    Oct. 29, 2009

(30) Foreign Application Priority Data

Sep. 26, 2005  (JP) ................. 2005-278905

(51) Int. Cl.
*G01C 3/08* (2006.01)
(52) U.S. Cl. ........................................ 356/5.01
(58) Field of Classification Search ........ 356/5.01, 356/5.09, 5.1, 5.13, 5.15
See application file for complete search history.

(56) References Cited

U.S. PATENT DOCUMENTS

| | | | |
|---|---|---|---|
| 3,900,261 A * | 8/1975 | Wingate | 356/5.03 |
| 5,619,317 A | 4/1997 | Oishi et al. | |
| 5,742,379 A * | 4/1998 | Reifer | 356/5.07 |
| 6,429,941 B1 * | 8/2002 | Kamon et al. | 356/614 |
| 6,665,055 B2 | 12/2003 | Ohishi et al. | |
| 6,803,998 B2 * | 10/2004 | Hunter et al. | 356/5.01 |
| 7,489,390 B2 * | 2/2009 | Yoshino et al. | 356/5.01 |

FOREIGN PATENT DOCUMENTS

| | | |
|---|---|---|
| JP | 6-003435 A | 1/1994 |
| JP | 7-191144 A | 7/1995 |
| JP | 2003-185747 A | 7/2003 |

\* cited by examiner

*Primary Examiner* — Isam Alsomiri
(74) *Attorney, Agent, or Firm* — Foley & Lardner LLP

(57) ABSTRACT

A surveying instrument and a surveying method for further minimizing a measurement error when the surveying instrument casts a light to a measuring object and receives the reflected light and measures a delay time or a distance. A reference pulse light r and a measurement pulse light $o_1$ are received as a received light signal by a light receiving section 9, and a damping signal S3U is formed from the received light signals r, $o_1$, and an amplification rate of a minute level signal in the proximity of a zero cross point $Q_0$ of the damping signal S3U is greatly amplified, and timing signals r', $o_1$' are formed by using an amplified signal. Therefore, the measurement error can be minimized.

9 Claims, 5 Drawing Sheets

CALCULATING SECTION 27 + CALCULATING CIRCUIT SECTION 22 = MEASUREMENT VALUE CALCULATING SECTION 33

SURVEYING INSTRUMENT AND SURVEYING METHOD

TECHNICAL FIELD

This invention relates to a surveying instrument and a surveying method. More specifically, this invention relates to a surveying instrument and a surveying method for determining delay time or distance by casting light to a measuring object, and receiving the reflected light.

BACKGROUND ART

Conventionally, there are instruments that receive the light reflected from a measuring object (object to be measured) such as a target and amplified with a photo multiplier or avalanche photodiode (APD), and performs a predetermined process, to determine delay time or distance. For such instruments, it is required to receive the light in the wide range level from the strong reflected light from near distance to the minute reflected light from far away. In this case, the intensity change of the received signal easily appears in the measurement error, so an instrument that performs a delay time measurement or distant measurement by detecting a zero cross point of the damping signal that is a part of the frequency component taken out from the received light signal and by amplifying, has been proposed. (Refer to for example Patent Document 1).
[Patent Document 1] JP 7-191144 A; par. 0056-0062, 0113 to 0120, FIG. 1, and FIG. 9 (a)

DISCLOSURE OF INVENTION

Problems to be Solved by the Invention

However, the conventional instruments, although they can weaken the effect of the size in the amplitude or intensity by using the damping frequency waveform of the received light signal, they cannot solve the measurement error, by only performing amplification evenly, and they are not good enough for the highly precise measurement. On the other hand, further highly precise survey is required. Therefore, a surveying instrument and a surveying method for decreasing the measurement error are longed for.

The object of the invention is to provide a surveying instrument and a surveying method that further minimize the measurement error, when it casts light to a measuring object and receive the reflected light to determine delay time or distance.

Means for Solving the Problem

Figure 1:
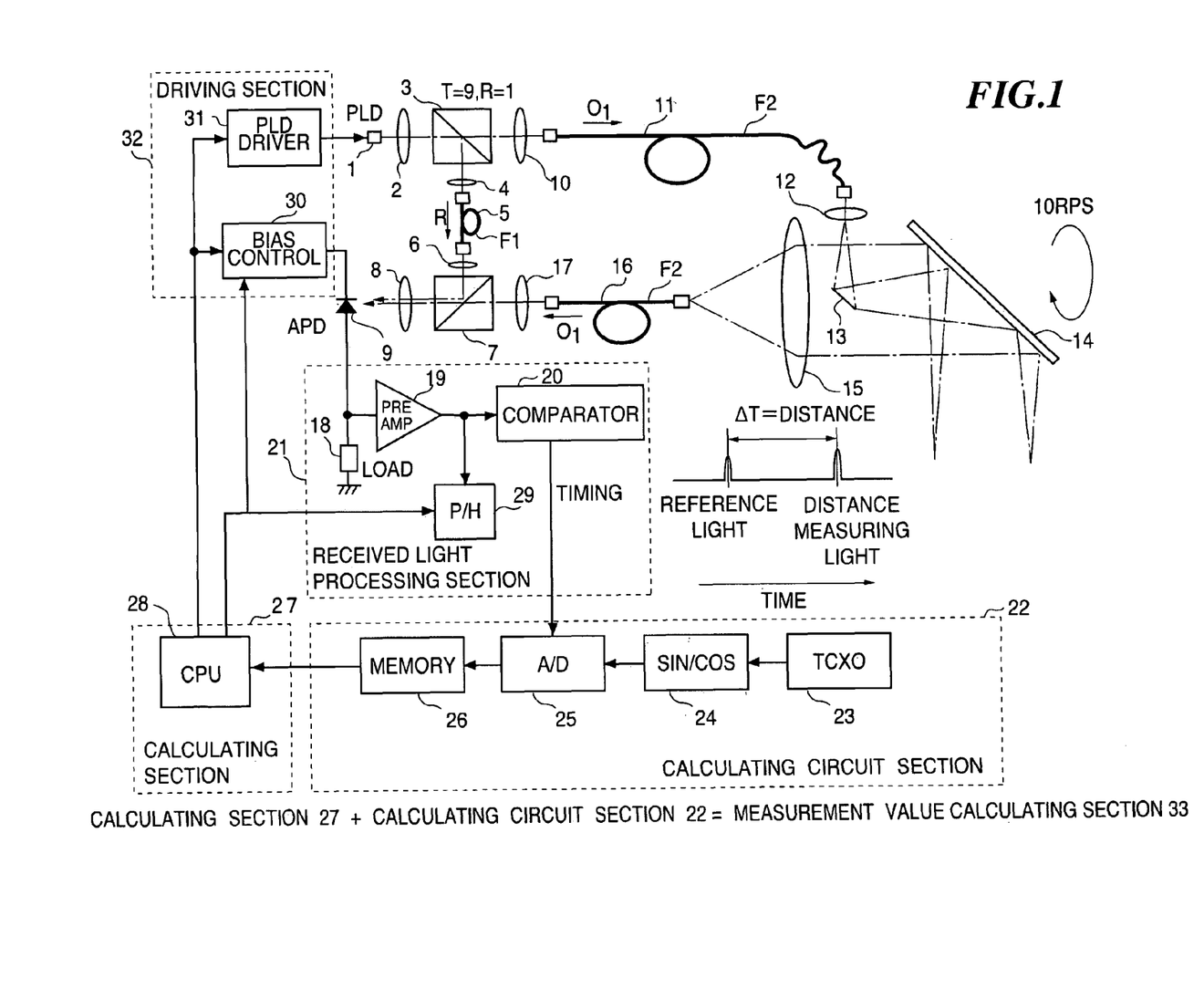
FIG. 1 is a block diagram illustrating a structure according to a first embodiment of the present invention.
Figure 2A:
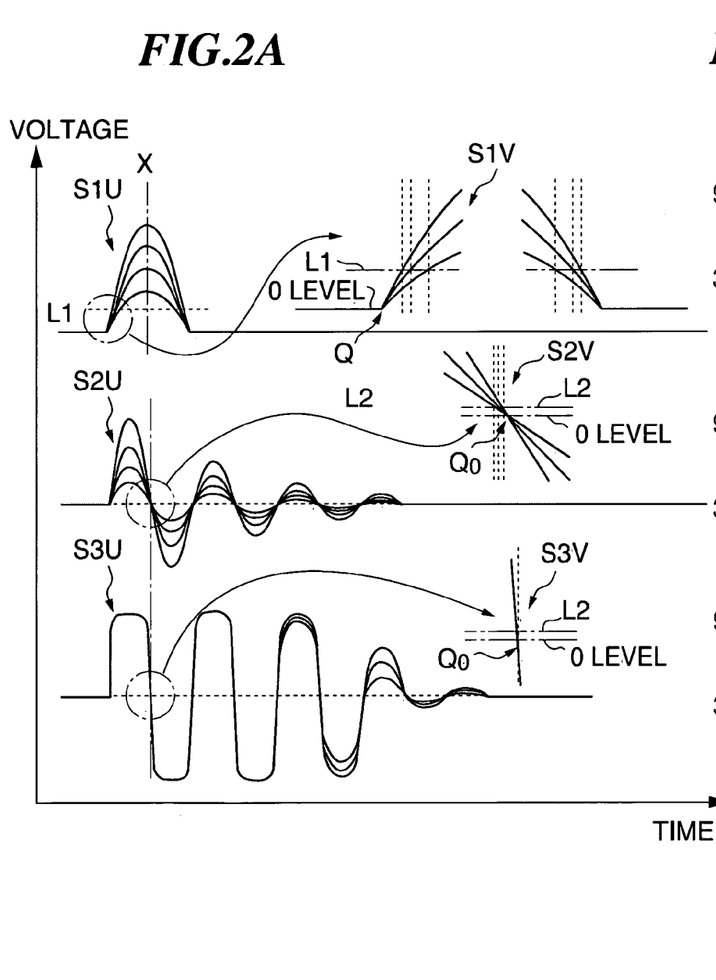
FIG. 2A and FIG. 2B shows the relationship between a load and a motion waveform of APD according to the first embodiment.
Figure 2B:
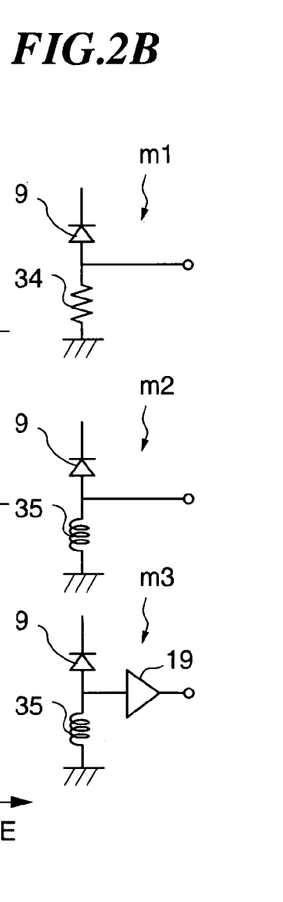
Figure 3:
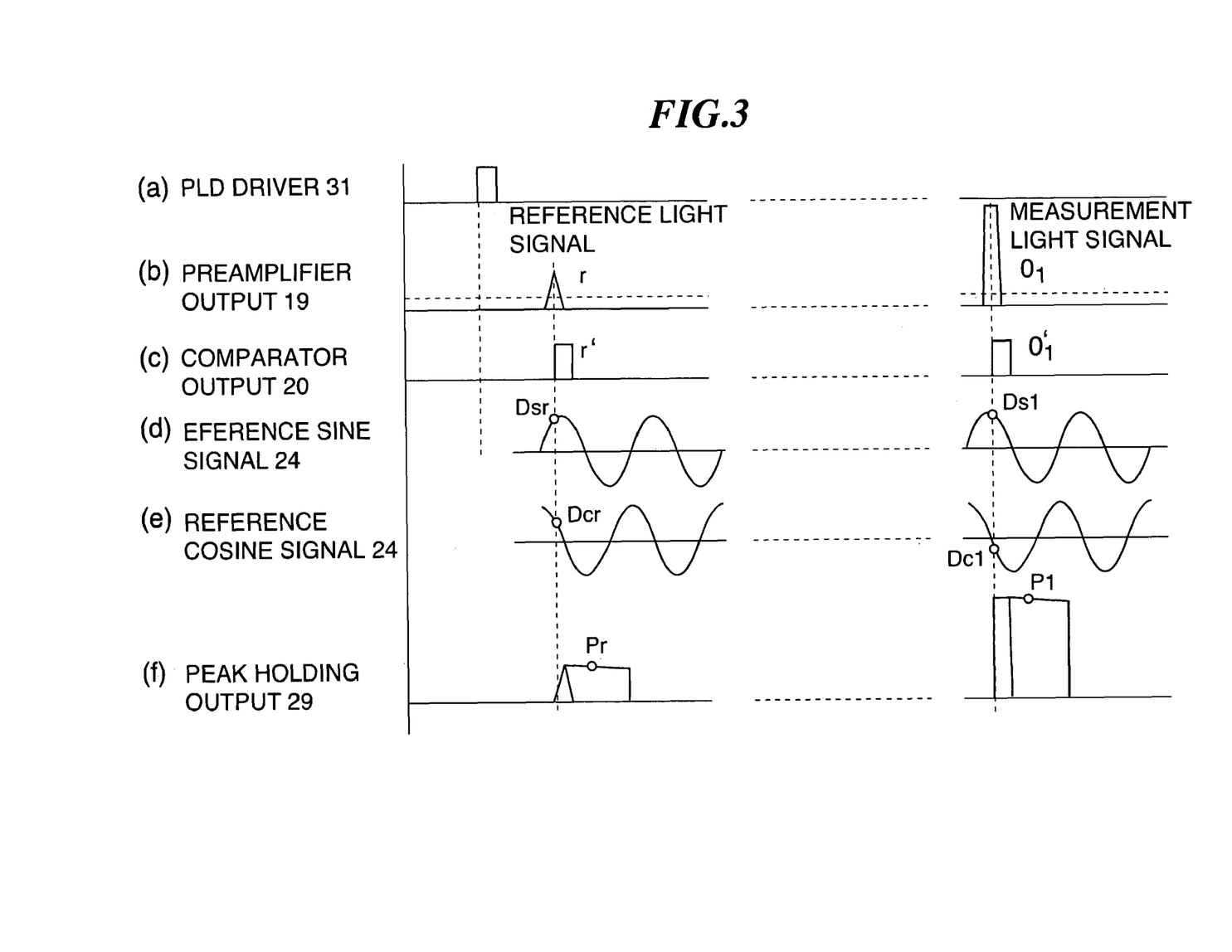
FIG. 3 illustrates a signal flow after light is received.

To achieve the above problem, a surveying instrument according to aspect (1) of the present invention comprises, as shown in FIG. 1-FIG. 3 for example, a light receiving section 9 for receiving a reference pulse light r and a measurement pulse light $o_1$ as a received light signal, a extract signal forming means 35 for forming a extract signal S3U that is a part of frequency component extracted from the received light signal r, $o_1$, an amplifier 19 for amplifying a minute level signal in the extract signal S3U with a high amplification rate, a timing signal forming section 20 for forming a timing signal r', $o_1'$ from the received light signal r, $o_1$, by using an amplified signal of the minute level signal amplified by the amplifier; and a measurement value calculating section 33 for calculating a delay time of the measurement pulse light $o_1$ in relation to the reference pulse light r or a distance from a measuring object based on a light receiving time difference between a timing signal r' formed from the reference pulse light r and a timing signal $o_1'$ formed from the measurement pulse light $o_1$.

Here, the surveying instrument is supposed to include an instrument for measuring the time difference required by the light transmission or time difference for the light receipt. Also, as for the measurement of the delay time and the distance, one of them may be performed, or the distance may be measured after the delay time is measured, or the delay time may be measured after the distance is measured, also, each section of the measurement amount calculating section 33 or the like may not be constituted in a single unit, or for example a computer used for calculation may be constituted separately from an electric circuit. Also, a part of the frequency component, is most preferably the frequency equivalent to the half value width of the pulse. However, it is not necessarily limited to this, and it may have some degree of frequency width. Constituting in this way, a surveying instrument for minimizing the measurement error when it casts the light to a measuring object and receives the reflected light to determine the delay time or distance can be provided.

The invention according to aspect (2) of the present invention, in the surveying instrument according to aspect (1), as shown in FIG. 3 for example, the timing signal forming section 36 forms the timing signal r', $o_1'$ at the time when a barycenter equivalent position of the received light signal r, $o_1$ is detected.

Constituting in this way, since the timing signals r', o' are generated by detecting the barycenter equivalent position of the received light signals r, $o_1$, the measurement error can be decreased.

Here, the barycenter or the barycenter equivalent position of the received light signals r, $o_1$ indicates a barycenter on the time axis of one dimension and its position, and it is defined by assigning weight by amplitude. For example as shown in FIG. 3, in a case of a line symmetrical figure that is symmetric in relation to a perpendicular line to a time axis, the position of the barycenter coincides with the position of the symmetric axis. That is, as shown in FIG. 3, in a case that the figure is for example an isosceles triangle, the barycenter equivalent position coincides with the position of foot of the perpendicular line directed down from the vertex to the time axis, and in a case of a symmetrical rectangle, it coincides with the center position between two points where the opposite sides respectively intersect the time axis.

The invention according to aspect (3) of the present invention, in the surveying instrument according to aspect (2), as shown in FIG. 2A or 2B for example, the timing signal forming section 36 detects a proximity of a zero cross point $Q_0$ of the extracted signal S3U as a barycenter equivalent position of the received light signal r, $o_1$.

Here, the extract signal is supposed to include a signal after amplification. Constituting in this way, the measurement error can be minimized since it uses the steep gradient of the waveform in the vicinity of the zero cross point $Q_0$ is used.

Figure 5A:
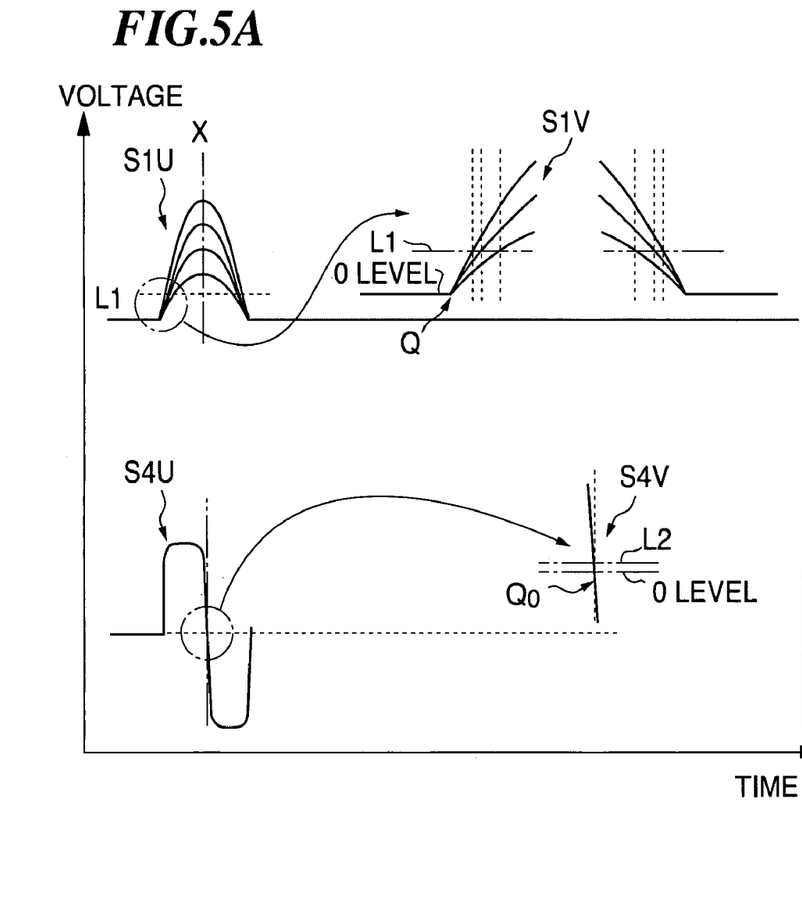
FIG. 5A and FIG. 5B shows the relationship between a load and a motion waveform of APD according to a second embodiment.
Figure 5B:
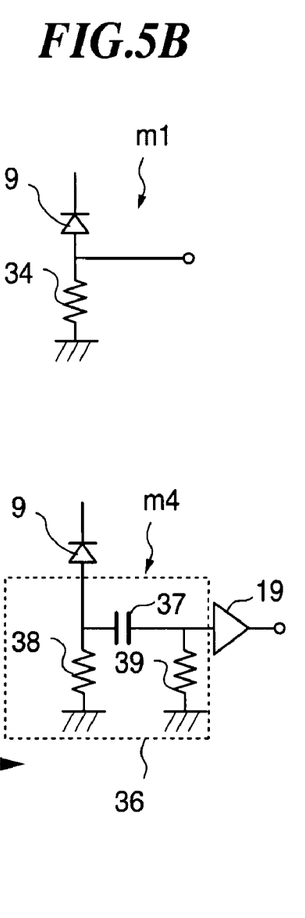

The invention according to aspect (4) of the present invention, in the surveying instrument according to aspect (3), as shown in FIG. 2A or 2B for example, the extracted signal S3U is a damping signal or a differential signal as shown at extract signal S4U in FIG. 5A or 5B.

Constituting in this way, the barycenter equivalent position of the received light signals r, $o_1$ can be precisely detected.

The invention according to aspect (5) of the present invention, in the surveying instrument according to aspect (4), as shown in FIG. 2A or 2B for example, the extract signal forming means 35 includes an inductor between the light receiving section 9 and a ground.

Constituting in this way, a damping signal can be easily obtained with a simple circuit using the inductor 35. Also, appropriate setting of an inductance results in an appropriate damping signal.

The invention according to aspect (6) of the present invention, in the surveying instrument according to any one of aspect (3) to aspect (5), as shown in FIG. 2A or 2B for example, the amplifier 19 amplifies a high level signal with low rate or barely changes a position of the zero cross point $Q_0$ of the extract signal S3U due to saturation.

Constituting in this way, an amplification rate can be set lower for the high level received light signals r, $o_1$, or the value after amplification can be limited, so it is preferable for widening the dynamic range.

The invention according to aspect (7) of the present invention, in the surveying instrument according to any one of aspect (1) to aspect (6), the measuring object includes a target.

Constituting in this way, highly precise measurement can be efficiently performed by using a target. The term "target" refers to a mark to be affixed to a measuring object so that the position and the shape of the measuring object is determined with high precision at the survey.

Figure 4:
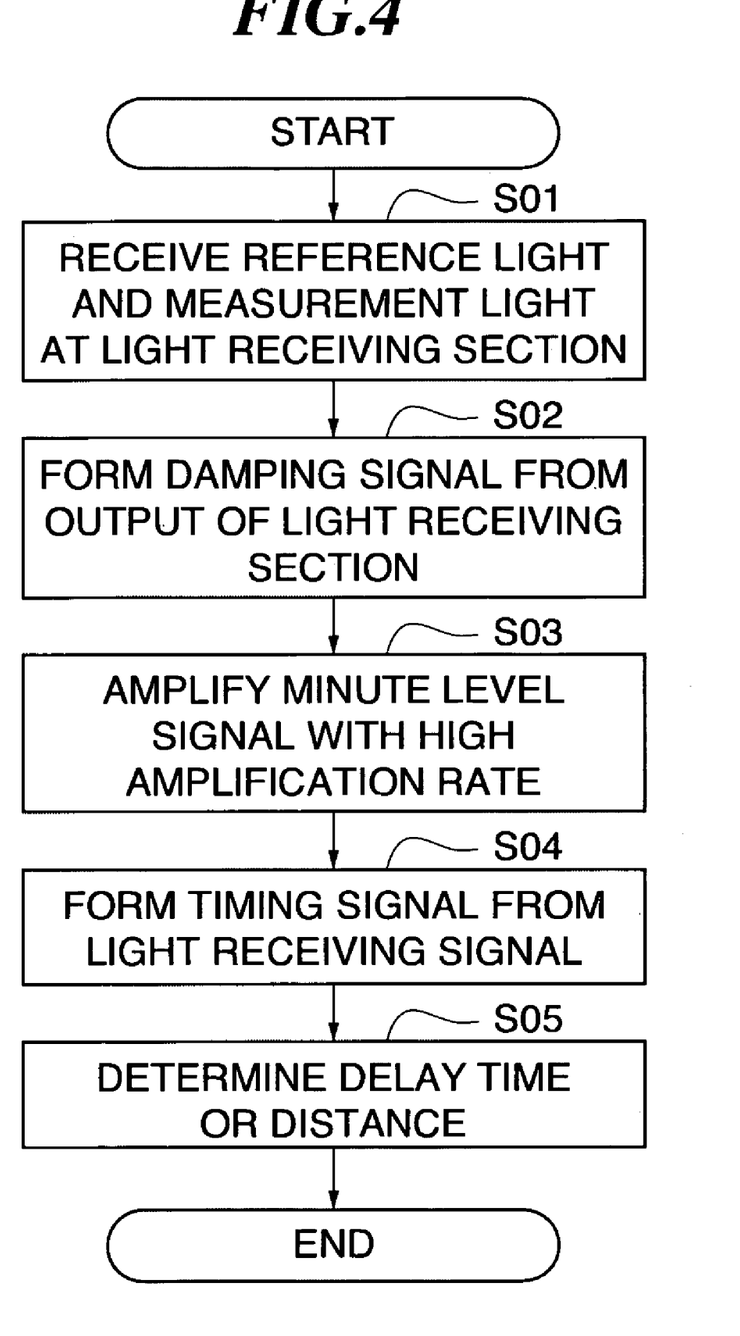
FIG. 4 is a schematic diagram, showing a flow of the process of a surveying method according to the first embodiment.

To achieve the above problem, a surveying method according to aspect (8) of the present invention comprises, as shown in FIG. 4 for example comprises, a light receiving step (S01) of receiving a reference pulse light r and a measurement pulse light $o_1$ as a received light signal by a light receiving section 9; a extract signal forming step (S02) of forming a extract signal S3U that is a part of frequency component extracted from the received light signal r, $o_1$, an amplifying step (S03) of amplifying a minute level signal in the extract signal with a high amplification rate, a timing signal forming step (S04) of forming a timing signal r', $o_1$' from the received light signal r, $o_1$, by using an amplified signal of the minute level signal amplified by the amplifying step (S03), and a measurement value calculating step (S05) for calculating a delay time of the measurement pulse light $o_1$ in relation to the reference pulse light r or a distance from a measuring object based on a light receiving time difference between a timing signal r' formed from the reference pulse light r and a timing signal r, $o_1$' formed from the measurement pulse light $o_1$.

Constituting in this way, a surveying method that minimizes the measurement error when the light is cast to a measuring object and the reflected light is received to determine the delay time or distance can be provided.

The invention according to aspect (9) of the present invention, in the surveying method according to aspect (8), as shown in FIG. 2A or 2B for example, the extract signal includes a damping signal or a differential signal.

Constituting in this way, since the timing signals r', $o_1$' are generated by precisely detecting the barycenter equivalent position of the received light signals r, $o_1$, the measurement error can be decreased.

EFFECT OF THE INVENTION

According to the present invention, a surveying instrument and a surveying method that further minimize the measurement error when the light is cast to a measuring object and the reflected light is received to determine the delay time or the distance can be provided.

This application is based on the Patent Application No. 2005-278905 filed on Sep. 26, 2005 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

DESCRIPTION OF REFERENCE NUMERALS AND SYMBOLS

1: light emitting section (PLD)
2: collimating lens
3: beam splitter
4: condenser lens
5: reference fiber
6: lens
7: beam splitter
8: lens
9: light receiving section (APD)
10: condenser lens
11: light emitting fiber
12: lens
13: mirror
14: mirror
15: lens
16: light receiving fiber
17: lens
18: load
19: preamplifier
20: timing signal forming section (comparator)
21: received light processing section
22: calculating circuit section
23: reference clock generating circuit
24: reference sine/cosine signal generating circuit
25: two circuit included A/D converter
26: memory
27: calculating section
28: CPU
29: peak holding circuit 30: bias adjuster
31: PLD driver
32: driving section
33: measurement amount calculating section
34: resistor
35: extract signal forming means (inductor)
36: extract signal forming means (differentiation circuit)
37: condenser
38 39: resistor
F1: reference light path
F2: measurement pulse light path
L1, L2: threshold value
m1-m4: circuitry of the received light processing section (load and preamplifier section)
$o_1$: measurement pulse light signal
Q: rising point
$Q_0$: zero cross point
r: reference pulse light signal
r', $o_1$': timing signal
S1U-S4U, S1V-S4V: signal waveform

BEST MODE FOR CARRYING OUT THE INVENTION

Hereinafter, the embodiments of the present invention are described with reference to the accompanying drawings.

In the embodiments, an explanation is made for a surveying instrument and a surveying method using TOF (Time of Flight) measurement that performs measurement of the delay time (required time difference) of the measurement light pulse in relation to the reference pulse light or the distance to the measuring object, where a light emitting element (pulse laser diode: PLD) is used as a light source, the measurement pulse light cast from the light source is reflected at the measuring object, and the required time duration needed for the reflected light to return is detected.

FIG. 1 is a block diagram, illustrating an example of the instrument structure according to the first embodiment of the present invention.

A light beam from a PLD 1, that is a light emitting element, is made into a parallel light beam by a collimating lens 2, and cast into a beam splitter 3, and divided into an external measuring pulse light beam (measurement pulse light) $o_1$ and an internal measuring pulse light beam (reference pulse light) r.

The reference pulse light r reflected at the beam splitter 3, is condensed by a condenser lens 4 and passes through a reference fiber 5, and then transformed into a parallel light beam again by a lens 6 and cast into a beam splitter 7, and the reflected light is condensed on APD (avalanche photodiode) 9 that is a light receiving element. Here, the light path from the PLD 1 through the beam splitter 3, the reference fiber 5, the lens 8 up to the APD 9 is called a reference path F1, and the period of time required to receive this reference pulse light r is called the reference time.

The measurement pulse light $o_1$ that passed through the beam splitter 3 is condensed on a light emitting fiber 11 by a condenser lens 10. By making this light emitting fiber 11 long enough in relation to the reference fiber 5, it can have a function, as a delaying fiber, of delaying the measurement pulse light $o_1$ for time concern with respect to the reference pulse light r. Also it can have a mixing function of removing unevenness or speckles in the light source.

The exit light from the light emitting fiber 11 is collimated by a lens 12 and then reflected by a mirror 13, further, reflected by a mirror 14 and introduced to outside of the instrument, and then cast to a measuring object (not shown).

The mirror 14 is constituted to rotate about the light axis, and able to measure the 360 degree entire range of the outer region of the instrument.

The measurement pulse light $o_1$ reflected from the measuring object, is reflected by the mirror 14 and then condensed on a light receiving fiber 16 by a lens 15. The measurement pulse light $o_1$ that passed through the light receiving fiber 16 is transformed into a parallel light beam by a lens 17, and passes through the beam splitter 7 and then condensed on the APD 9 by a lens 8.

Here, the light path from the PLD 1 to the APD 9, through the beam splitter 3, the light emitting fiber 11, the measuring object as a light reflector, the light receiving fiber 16 and the lens 8, is called a measurement pulse light path F2. Also, time taken for the measurement pulse light $o_1$ to be received is defined to be called the measurement time and the delay time of the measurement pulse light $o_1$ relative to the reference pulse light r and the distance to the measuring object can be obtained, by obtaining the time difference between the measurement time and the reference time.

Between a case in which the measuring object is far away from the measurement instrument and a case in which it is in the vicinity, the expected light amount change is very large, so the received light processing system requires a wide dynamic range.

A driving section 32 is constituted by a PLD driver 31 for driving the light emitting element PLD 1, and a bias adjuster 30 for adjusting the bias of the light receiving element APD 9 and the like. A single pulse is generated in the PLD 1 driven by the PLD driver 31. The received light processing section 21 processes the received light signals r, $o_1$ received by the APD 9 before the process performed by the measurement value calculating section 33, and includes a load 18, a preamplifier 19, a comparator 20, and a peak holding circuit 29 etc. The received light signals, first the reference pulse light signal r, then the measurement pulse light signal $o_1$, are cast to the light receiving element APD 9 in this order, and amplified by the APD 9. The inverse bias voltage of the APD 9 is regulated by the bias adjuster 30, and the current amplification rate is adjusted.

The output signal from the APD 9 is converted in current/voltage (typically from current to voltage) by the load 18, and further amplified by the preamplifier 19, and inputted to the comparator 20 and the peak holding circuit 29. The reference pulse light signal r and the measurement pulse light signal $o_1$ are respectively converted into digital timing signals r', $o_1$' by the comparator 20. In this way, the comparator 20 of the received light processing section 21 functions as a timing signal forming section for forming the timing signal from the received light signal. Also, the reference pulse light signal r and the measurement pulse light signal $o_1$ are compared to the range (standard range) of the appropriate dynamic range of the received light processing section 21 in the peak holding circuit 29, and the result of the comparison is reflected to the bias adjuster 30, and then the inverse bias voltage is adjusted. It is described later about the measurement value calculation section 33 (calculating section 27+ calculating circuit section 22).

Moreover, the PLD drive circuit 31 for driving the light source PLD 1 is constituted to be controlled by the calculation section 27. According to this constitution, the received light processing section 21 is not easily affected by the change in the amount of received light.

Next, it is described about a received light signal processing.

FIG. 2 shows a relationship between the load 18 connected between the APD 9 as a light receiving element and a ground and the motion waveform of the APD 9. In FIG. 2 (*a*), the motion waveform of the APD 9 is shown, and in FIG. 2 (*b*), a damping circuitry (m1 to m3) of the load 18 and the preamplifier 19 are shown as the received light processing section 21. When the light beam emitted with pulsed light is received in the APD 9, in a case that the load 18 is a commonly used resistor 34 (refer to m1), the received light signal becomes like a waveform S1U, and when the proximity of zero level is enlarged, it becomes like a waveform S1V.

For eliminating the effect of the noise, it is general that the comparison between the waveform S1V and the threshold value L1 (the level is indicated by a dashed line) is made, and the determination is made by its size. However, if the waveform has a gradual gradient like the waveform S1V, there is a problem that the difference increases larger when the received light amount changes. That is, when the gradient becomes smaller, the point where the waveform S1V crosses the threshold value L1 is farther away from the rising point Q of the waveform, and when the gradient becomes larger, the point where the waveform S1V crosses the threshold value L1 is nearer the rising point Q. Therefore, it can be understood that, in a case that the light receiving time is determined by the crossing point with the threshold value L1, if the gradient of the waveform is gradual, the measurement value of the light receiving time changes greatly when the change amount of the received light signal becomes larger. Also, in order to avoid the error by noise, it may be applied with a process for example to provide a hysteresis characteristic (using a different threshold value between the rising time and fall time), still, there remains a problem that the error is inevitable when the received light amount changes.

By the way, generating the timing signals r', $o_1$' at the barycenter position of the received light signals r, $o_1$, is preferable because the measurement error of the light receiving time can be small. As shown in the waveform S2U, when using the inductor 35 as the load 18 (refer to m2), a certain frequency component is extracted from the received light signals r, $o_1$ (a certain frequency component is preferably the frequency equivalent to the half value width of the pulse, however, it is not necessarily limited to this, also, it may have some degree of frequency width), and the damping frequency waveform is taken out, its zero cross point $Q_0$ does not move even when the amplitude changes, and it is regarded as a barycenter equivalent position of the received light signals r, $o_1$, so the method using the zero cross point $Q_0$ for the measurement is adopted. As for the extracting of a part of the frequency component, the damping frequency waveform can be extracted from the pulse signal, using the resonant circuit formed by for example the inductor 35 and the parasitic capacitance. In FIG. 2, in the circuit m2 constituted with the received light section 9 and the inductor 35 as the load 18, the inductor 35 portion constitutes an extract signal forming means for forming the extract signal S2U that is a part of the frequency component extracted from the received signals r, $o_1$ by the inductor 35 portion. The damping frequency waveform S2U taken out here is a damping signal.

When the proximity of the zero cross point $Q_0$ of the waveform S2U is enlarged, it becomes like a waveform S2V. And, as shown, if the upper dashed line is supposed to be the threshold value L2 and the lower dashed line is supposed to be the zero line, in a case the gradient of the waveform is gradual in this damping frequency waveform, the crossing point with the threshold value L2 changes according to the gradient of the waveform S2V, and the measurement value of the light receiving time also changes greatly, when the change amount of the received signals r, $o_1$ becomes larger.

In the embodiment, as shown in the waveform S3U, the damping frequency is generated by disposing the inductor 35 directly to the load 18 of the light receiving element (APD) 9, and the preamplifier 19 that greatly amplifies the amplification rate of the minute level signal is also disposed to its output, and the received light processing section 21 that is not easily affected by the light amount change is constituted (refer to m3). That is, as shown in the waveform S3V, the gradient in the vicinity of the zero cross point $Q_0$ is made steep. As shown, if the upper dashed line is supposed to be the threshold value L2 and the lower dashed line is supposed to be the zero line, it takes a constitution in which by greatly amplifying the amplification rate of the minute level signal, so the change of time of the cross point with the threshold value L2 according to the light amount change is restrained as much as possible.

That is, in the circuit m3 constituted with the received light section 9, the inductor 35 as the load 18 and the preamplifier 19, the inductor 35 portion constitutes a extract signal forming means for forming a extract signal S3U that is a part the frequency component extracted from the received signals r, $o_1$ by the inductor 35 portion. The damping frequency waveform S3U taken out here is a damping signal as well as the S2U. In the circuit m3, by disposing the preamplifier 19 on the output side of the extract signal forming means 35, the gradient at the zero cross point $Q_0$ of the damping frequency waveform S3U is made steep.

Here, preferably the preamplifier 19 has, regarding the high level in the waveform, no change of a phase according to amplification, that is, has no movement of the zero cross point. Therefore, an amplifier in which the amplification rate is low or change of a phase does not occur in a case of saturation is preferable. As these amplifiers, a limiting amplifier or a log amplifier can be used to obtain the expected characteristic.

In this way, in a case that the measurement point is set to be a zero cross of the damping signal, an error is produced by the signal amplitude according to the threshold or the like. However, effect of the error according to a tilt at the rising can be less, by amplifying with the log amplifier or the limiting amplifier, and by increasing the amplification rate in the proximity of the zero cross as in the present embodiment.

The flow of the delay time and distance measurement is described next.

FIG. 3 illustrates the flow of signals after receiving the light. The single pulse is generated from the light emitting element PLD 1 driven by the PLD driver 31 (refer to (a)). The received light signal cast into the light receiving element APD 9 is converted in current/voltage by the load 18 and then amplified by the preamplifier 19. The received light signal is generated in order of the reference pulse light signal r at first, and then the measurement pulse light signal $o_1$ as shown in the output of the preamplifier 19 (refer to (b)). The reference pulse light signal r and the measurement pulse light signal $o_1$ are converted respectively into the digital timing signals r', $o'_1$ by the comparator as a timing signal forming section 20 (refer to (c)). The timing signals r', $o'_1$ that are the output of the comparator 20 are sent to the calculating circuit section 22, and inputted to the A/D converter 25, and used to measure the delay time or the distance.

The calculating circuit section 22 is constituted with: a reference clock generating circuit (TCXO) 23, a reference sine/cosine signal generating circuit 24, a two circuit included A/D converter 25 (for reference sine/cosine signal), and a memory 26 or the like. The calculating circuit section 22 calculates the delay time (time deference required) or the distance to the measuring object. That is, a measurement amount calculating section 33 that calculates the delay time or the distance to the measuring object is constituted with the calculating section 27 and the calculating circuit section 22.

In the calculating circuit section 22, the clock as the reference for a device is generated by the reference clock generating circuit (TCXO) 23, and produces the reference sine/cosine signal of a predetermined frequency is generated with the reference sine/cosine signal generating circuit 24 (refer to (d), (e)). As long as the reference sine/cosine signal is produced as a signal of the known same frequency having the phase difference of accurately ninety degree, the delay time of the measurement pulse light $o_1$ in relation to the reference pulse light r or the distance from the measuring object, can be obtained by calculation according to the each phase of the sampled sine/cosine, by inputting the individual waveform to two A/D converters of the two circuit included A/D converter 25, by sampling using the received light timing of the reference pulse light r and measurement pulse light $o_1$, and by storing in the memory 26.

The data memorized by the above procedure can provide an accurate detection value without correction only if the light amount of the reference pulse light r and the measurement pulse light $o_1$ is within the appropriate dynamic range (standard range) of the received light processing section 21. Then, the output of the preamplifier 19 is peak-held in order to determine if the light amount of the reference pulse light r and the measurement pulse light $o_1$ is appropriate or not. The output of the preamplifier 19 is inputted to the peak holding circuit 29, and the DC level is maintained for a certain duration (refer to (f)). The output of the peak holding circuit 29 is inputted to the CPU (central processing unit), and it is determined if the light amount of the received light signals r, $o_1$ is appropriate or not. If the light amount of the measurement pulse light $o_1$ is appropriate, an accurate measurement value can be calculated using the measurement pulse light $o_1$.

The phase data of the reference sine/cosine waveform stored in the memory 26, is calculated in the CPU 28 of the calculating section 27, and the delay time of the measurement pulse light $o_1$ with respect to the reference pulse light r and/or the distance to the object are calculated.

Also, in a case that the light amount of the measurement pulse light $o_1$ is not appropriate and these signal-phase-differences or amplitudes have an error, its time difference can be made appropriate by correction. That is, correction of the measurement value change is performed for the change of the received light level. In a case that the more precise measurement is performed, an exact difference between the light amount of the reference pulse light r and that of the measurement pulse light $o_1$ and the inverse bias voltage $V_R$ are calculated, and an error in the delay time or the measurement value of the distance produced due to the difference is corrected. In this case, the relationship between the light amount difference and the measurement value error is organized in table in advance, and correction may be performed according to the value in this table at every measurement.

When the light receiving time differs by 0.01 ns, the difference of 1.5 mm in distance is made. Therefore, in order to measure with accuracy of 1 mm or lower, the accuracy of the barycenter of pulse must be 0.02/3 ns or lower. The accuracy of 1.0 mm can be maintained when the correction is performed so that the accuracy of the actual correction is kept 0.3 mm or lower in the standard deviation by using the table. Accordingly, the correction table of ps order is created.

In FIG. 4, the process flow of the measurement method in the present embodiment is schematically shown.

At first, the reference pulse light r and the measurement pulse light $o_1$ are received as a received light signal by the light receiving section 9 (light receiving step: S01). Next, the extract signal that is a part of the frequency component extracted from the received light signals r, $o_1$ is formed (extract signal forming step: S02). The extract signal is preferably a damping signal or differential signal. Next, the amplification rate of the minute level signal in the extract signal is greatly amplified (amplification step: S03).

Next, the timing signals r', $o_1$' are formed from the received light signals r, $o_1$ by using the amplified signal of the minute level signal amplified by the amplifier 19 (timing signal forming step: S04). Next, the delay time of the measurement pulse light $o_1$ relative to the reference pulse light r or the distance from the measuring object is calculated based on the light receiving time difference between the timing signal r' formed from the reference pulse light r and the timing signal $o_1$' formed from the measurement pulse light $o_1$ (measurement value calculating step: S05).

Next, it is described about a second embodiment of the present invention. It is an example in which the differential signal is used instead of the damping signal in the first embodiment.

FIG. 5 shows the relationship between the load and the motion waveform of the APD according to the second embodiment. The waveform S1U and the circuit m1 are the same as in FIG. 2. The circuit m4 is made by replacing the damping circuit 35 of the circuit m3 in FIG. 2 with the differential circuit 36. For example, a circuit grounding the input terminal and the output terminal of a condenser 37 through resistors 38, 39 can be used as a differential circuit 36. When the received light signal waveform S1U passes through the differential circuit 36, a similar waveform to the one frequency cycle of the S2U in FIG. 2 (however it does not damp) can be obtained, and then, when it passes through the preamplifier 19 amplifying the minute level signal with the high amplification rate, as shown in the S4U, the waveform in which the gradient in the proximity of the zero cross point $Q_0$ is made steep can be obtained. This waveform is a waveform similar to the one cycle section of the S3U in FIG. 2 (however it does not damp). When the proximity of the zero cross point $Q_0$ of the waveform S4U is enlarged, it appear to be like the waveform S4V. And, in the drawing, if the upper dashed line is supposed to be the threshold value L2, and if the lower dashed line is supposed to be the zero line, by amplifying the minute level signal the high amplification rate, the change of the time at the cross point with the threshold value L2 by the light amount change is restrained as much as possible, therefore the effect of the error due to the tilt at the rising of the signal can be reduced.

In this way, in the circuit m4 constituted with the light receiving section 9, the differential circuit 36 and the preamplifier 19, the differential circuit 36 portion constitutes the extract signal forming means for forming the extract signal that is a part of the frequency component extracted from the received light signals r, $o_1$. The extract signal waveform extracted here is a differential signal waveform. Also, a part of the frequency component, is most preferably the frequency equivalent to the half value width of the pulse. However, it is not necessarily limited to this, and it may have some degree of frequency width.

The remaining constitution in the present embodiment is the same as in the first embodiment, and the present embodiment performs about the same effects as in the first embodiment.

Embodiments of this invention have been described above. It should be understood that this invention is not limited to the embodiments described above, but various modifications may be obviously made to the embodiments without departing from the spirit of this invention.

For example, in the above embodiments, an example in which the extract signal forming means 35 is an inductor is described. Alternatively a resonant circuit such as LC resonant circuit may be used as an extract signal forming means 35. Also, the above embodiments are constituted such that the output of the preamplifier 19 of the light receiving section (APD) 9 is detected by the peak holding circuit 29, and the regulation of the inverse bias voltage of the APD 9 can be performed by the bias adjuster 30 of the driving section 32 according to the level of the received light signals r, $o_1$ in the CPU28 of the calculating section 27. Instead of it, the bias adjuster 30 may directly accept the data of the peak holding circuit 29 and regulate the inverse bias voltage of the APD 9. Also, in the above embodiments, the mirror 14 is rotated in order to cast the measurement pulse light $o_1$ to the measuring object. The reflected light from the mirror 13 may be condensed directly on the measuring object, and also the other constitutions are possible. Also, the light source 1 is not limited to the light emitting element, and the light receiving section 9 is not limited to the APD.

INDUSTRIAL APPLICABILITY

This invention is used for a surveying instrument and a surveying method for determining a delay time or distance by casting light to a measuring object and receiving the reflected light.

The invention claimed is:

1. A surveying instrument comprising:
a light receiving section for receiving a reference pulse light and a measurement pulse light as a received light signal;
an extract signal forming means for forming an extract signal that is a part of a frequency component extracted from the received light signal;
an amplifier for amplifying a minute level signal in the extract signal with a high amplification rate, the minute level signal being in a proximity of a zero cross point;
a timing signal forming section for forming a timing signal from the received light signal, by using an amplified signal of the minute level signal amplified by the amplifier;
and a measurement value calculating section for calculating a delay time of the measurement pulse light in relation to the reference pulse light or a distance from a measuring object based on a light receiving time difference between a timing signal formed from the reference pulse light and a timing signal formed from the measurement pulse light,
wherein said amplifier includes one of a limiting amplifier or a log amplifier with a higher amplification rate of the minute level signal than an amplification rate of a signal in the extract signal of areas other than the proximity of the zero cross point.

2. The surveying instrument according to claim 1, wherein the timing signal forming section forms the timing signal at the time when a barycenter equivalent position of the received light signal is detected.

3. The surveying instrument according to claim 2, wherein the timing signal forming section detects the proximity of a zero cross point of the extract signal as a barycenter equivalent position of the received light signal.

4. The surveying instrument according to claim 3, wherein the extract signal is a damping signal or a differential signal.

5. The surveying instrument according to claim 4, wherein the extract signal forming means includes an inductor between the light receiving section and a ground.

6. The surveying instrument according to claim 3, wherein the amplifier amplifies a high level signal with low rate or barely changes a position of the zero cross point of the extract signal due to saturation.

7. The surveying instrument according to claim 1, wherein the measuring object includes a target.

8. A surveying method comprising: a light receiving step of receiving a reference pulse light and a measurement pulse light as a received light signal by a light receiving section;
an extract signal foaming step of forming an extract signal that is a part of a frequency component extracted from the received light signal;
an amplifying step of amplifying a minute level signal in the extract signal with a high amplification rate, the minute level signal being in a proximity of a zero cross point;
a timing signal forming step of forming a timing signal from the received light signal, by using an amplified signal of the minute level signal amplified by the amplifying step;
a measurement value calculating step of calculating a delay time of the measurement pulse light in relation to the reference pulse light or a distance from a measuring object based on a light receiving time difference between a timing signal formed from the reference pulse light and a timing signal formed from the measurement pulse light,
wherein said amplifying step includes one of amplifying steps with a limiting amplifier or a log amplifier with a h her amplification rate of the minute level signal than an amplification rate of a signal in the extract signal of areas other than the proximity of the zero cross point.

9. The surveying method according to claim 8, wherein, the extract signal includes a damping signal or a differential signal.

* * * * *